US012796620B2

(12) United States Patent
Mate et al.

(10) Patent No.: US 12,796,620 B2
(45) Date of Patent: Nov. 17, 2026

(54) BALER KINEMATIC FOR COTTON PICKER

(71) Applicant: DEERE & COMPANY, Moline, IL (US)

(72) Inventors: Mahesh Mate, Pune (IN); Shrikant Sadavarte, Thane (IN); Jeremy P. Robison, West Des Moines, IA (US)

(73) Assignee: Deere & Company, Moline, IL (US)

( * ) Notice: Subject to any disclaimer, the term of this patent is extended or adjusted under 35 U.S.C. 154(b) by 371 days.

(21) Appl. No.: 18/572,046

(22) PCT Filed: Apr. 11, 2022

(86) PCT No.: PCT/US2022/024219
§ 371 (c)(1),
(2) Date: Dec. 19, 2023

(87) PCT Pub. No.: WO2023/003606
PCT Pub. Date: Jan. 26, 2023

(65) Prior Publication Data

US 2024/0284833 A1 Aug. 29, 2024

Related U.S. Application Data

(60) Provisional application No. 63/223,209, filed on Jul. 19, 2021.

(51) Int. Cl.
*A01F 15/07* (2006.01)
*A01D 46/08* (2006.01)
*A01F 15/08* (2006.01)

(52) U.S. Cl.
CPC .............. *A01F 15/07* (2013.01); *A01F 15/08* (2013.01)

(58) Field of Classification Search
CPC .... A01D 46/08; A01D 46/085; A01D 46/084; A01D 46/12; A01D 46/16; A01D 75/20;
(Continued)

(56) References Cited

U.S. PATENT DOCUMENTS 4,389,929 A 6/1983 Kluver et al.
6,272,816 B1 8/2001 Viaud et al.
(Continued)

FOREIGN PATENT DOCUMENTS

AU 2012101001 A4 8/2012
CN 1332953 A 1/2002
(Continued)

OTHER PUBLICATIONS

International Preliminary Report on Patentability for PCT/US2022/024219; dated Jan. 18, 2024; 1 Page.
(Continued)

*Primary Examiner* — Robert E Pezzuto

(74) *Attorney, Agent, or Firm* — Taft Stettinius & Hollister LLP; Stephen F. Rost

(57) ABSTRACT

A baler assembly for a cotton harvester. The baler assembly has a chassis, a front component pivotally coupled to the chassis about a front chassis axis, a gate component pivotally coupled directly to the front component about a component axis, a handler pivotally coupled to the chassis about a handler axis and configured to pivot between a raised orientation and a lowered orientation, and a cradle defined on the handler and configured to selectively receive a pin of the gate component. The baler assembly transitions from a work configuration to a transport configuration by positioning the pin in the cradle and transitioning the handler to the lowered orientation while the gate component pivots about the component axis relative to the front component.

20 Claims, 7 Drawing Sheets

(58) Field of Classification Search
CPC .... A01D 75/18; A01D 41/02; A01D 41/1261; A01F 15/07; A01F 15/08; A01F 15/0715
See application file for complete search history.

(56) References Cited

U.S. PATENT DOCUMENTS

| | | | | |
|---|---|---|---|---|
| 6,421,996 | B1 * | 7/2002 | Deutsch | A01D 46/084 100/88 |
| 6,843,170 | B1 | 1/2005 | Guthman et al. | |
| 6,941,740 | B2 | 9/2005 | Fox et al. | |
| 9,844,179 | B1 * | 12/2017 | Goering | A01D 41/02 |
| 2004/0083905 | A1 | 5/2004 | Viaud | |

FOREIGN PATENT DOCUMENTS

| | | | |
|---|---|---|---|
| CN | 1611101 | A | 5/2005 |
| CN | 205105706 | U | 3/2016 |
| CN | 106508300 | A | 3/2017 |
| CN | 107521293 | A | 12/2017 |
| CN | 107848234 | A | 3/2018 |
| CN | 109775004 | A | 5/2019 |
| EP | 3106023 | A1 | 12/2016 |

OTHER PUBLICATIONS

Written Opinion of the International Searching Authority for PCT/US2022/024219; dated Jul. 8, 2022; 6 Pages.
International Search Report for PCT/US2022/024219; dated Jul. 8, 2022; 2 Pages.

* cited by examiner

BALER KINEMATIC FOR COTTON PICKER

This application is a U.S. National Phase Entry of International Application Ser. No. PCT/US22/24219 filed on Apr. 11, 2022 and claims the benefit of U.S. Provisional Patent Application Ser. No. 63/223,209, filed Jul. 19, 2021 and entitled "BALER KINEMATIC FOR COTTON PICKER," the disclosures of which are hereby incorporated herein by reference in entirety.

FIELD OF THE DISCLOSURE

Field of the Disclosure

The present disclosure relates to a baler assembly, and more specifically to a baler assembly that can be transitioned to a transport configuration.

Background of the Disclosure

Cotton pickers or harvesters and the like often have baler assemblies that package harvested crop into bales for subsequent processing. The baler assembly has to be sufficiently large to capture and process the crop into a bale before being deposited on the underlying surface or elsewhere for further processing. Often, the baler assembly is configured to process a large volume of crop into a bale. The larger the bale, the more efficiently the user can consolidate harvested crop. Accordingly, it is often favorable to have a large baling assembly capable of producing large bales containing large volumes of harvested crop.

Large bale assemblies may cause transportation issues for a cotton harvester or other baling machine. More specifically, the bale assembly may be too large to be safely transported when in the baling configuration. As such, there is a need for a large bale assembly that can produce a large bale of harvested crop while also being easily reconfigurable into a transport configuration.

SUMMARY

One embodiment is a baler assembly for a cotton harvester that has a chassis, a front component pivotally coupled to the chassis about a front chassis axis, a gate component pivotally coupled directly to the front component about a component axis, a handler pivotally coupled to the chassis about a handler axis and configured to pivot between a raised orientation and a lowered orientation and a cradle defined on the handler and configured to selectively receive a pin of the gate component. The baler assembly transitions from a work configuration to a transport configuration by positioning the pin in the cradle and transitioning the handler to the lowered orientation while the gate component pivots about the component axis relative to the front component.

One example of this embodiment is a gate cylinder that selectively pivots the gate component about the component axis relative to the front component. Part of this example has a handler cylinder that selectively pivots the handler about the handler axis, wherein the handler cylinder and the gate cylinder are repositionable to position the pin of the gate component in the cradle.

In another example of this embodiment, the cradle has a profiled opening that allows the pin to transition into, or out of, the cradle when the handler is in a catch configuration and prevents the pin from transitioning out of the cradle when the handler is in the lowered orientation. In another example, as the baler assembly transitions from the work configuration to the transport configuration, the front component pivots about the front chassis axis, the gate component pivots about the component axis and a pin axis defined by the pin, and the handler pivots about the handler axis. In yet another example of this embodiment, the gate component only pivots about the component axis relative to the front component as the baler assembly transitions between the work configuration and the transport configuration.

In yet another example of this embodiment, the front component rotates about the front chassis axis greater than sixty degrees as the baler assembly transitions from the work configuration to the transport configuration. In another example, the front component and the gate component rotate about the component axis greater than eighty degrees relative to one another as the baler assembly transitions from the work configuration to the transport configuration.

In another example of this embodiment, the baler assembly is mounted to a work machine configured to move along a substantially planar underlying surface and the overall height of the baler assembly from the underlying surface to the top-most portion of the baler assembly in the transport configuration is no greater than four meters. In part of this example, the bottom-most portion of the handler is at least half a meter above the underlying surface in the transport configuration.

In yet another example of this embodiment, the baler transitions into a shipping configuration wherein the front component rotates about the front chassis axis greater than seventy degrees. In part of this example, the angle between the gate component and the front component is less in the shipping configuration than in the transport configuration.

Another embodiment of this disclosure is a work machine for baling a crop. The work machine has a chassis having at least one ground engaging mechanism coupled thereto configured to selectively move the work machine along an underlying surface, a harvesting assembly coupled to the chassis and configured to harvest a crop, and a baler assembly configured to arrange harvested crop into a bale or module. The bale assembly has a front component pivotally coupled to the chassis about a front chassis axis, a locking assembly configured to selectively lock the front component to the chassis to prevent the front component from pivoting about the front chassis axis, a gate component pivotally coupled to the front component about a component axis, a handler pivotally coupled to the chassis about a handler axis and configured to pivot between a raised orientation and a lowered orientation, and a cradle defined on the handler and configured to selectively receive a pin of the gate component. The baler assembly transitions from a work configuration to a transport configuration by releasing the locking assembly, positioning the pin in the cradle, and rotating the handler about the handler axis. Further, as the baler assembly transitions from the work configuration to the transport configuration the gate component pivots relative to the front component about the component axis.

In one example of this embodiment, the component axis extends through a portion of the front component and a portion of the gate component as the baler assembly transitions between the work configuration and the transport configuration.

Another example of this embodiment has a gate cylinder that selectively pivots the gate component about the component axis relative to the front component and a handler cylinder that selectively pivots the handler about the handler axis, wherein the handler cylinder and the gate cylinder are repositionable to position the pin of the gate component in the cradle. In part of this example, once the pin is positioned in the cradle, the handler cylinder transitions the gate component and front component into the transport configuration and the gate cylinder is in a neutral state.

In another example of this embodiment, when the baler assembly transitions from the work configuration to the transport configuration, the pin axis and component axis move relative to the chassis and the gate component is confined to movement about the pin axis and the component axis. In another example, the overall height of the baler assembly from the underlying surface to the top-most portion of the baler assembly in the transport configuration is no greater than four meters. In yet another example of this embodiment, the baler transitions into a shipping configuration wherein the angle between the gate component and the front component is less in the shipping configuration than in the transport configuration.

Yet another embodiment is a cotton-harvesting machine that has a chassis having at least one ground engaging mechanism configured to selectively move the chassis along an underlying surface, a baler assembly having a front component pivotally coupled to a gate component about a component axis, a handler pivotally coupled to the chassis about a handler axis, and a cradle defined on the handler and configured to selectively catch a pin of the gate component and guide the pin into a constrained pivot position. In this embodiment, the baler assembly transitions from a work configuration to a transport configuration by positioning the pin in the cradle and moving the handler to a lowered position. Further, as the baler assembly transitions to the lowered position, the front component pivots relative to the chassis and the gate component pivots relative to the front component about the component axis.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
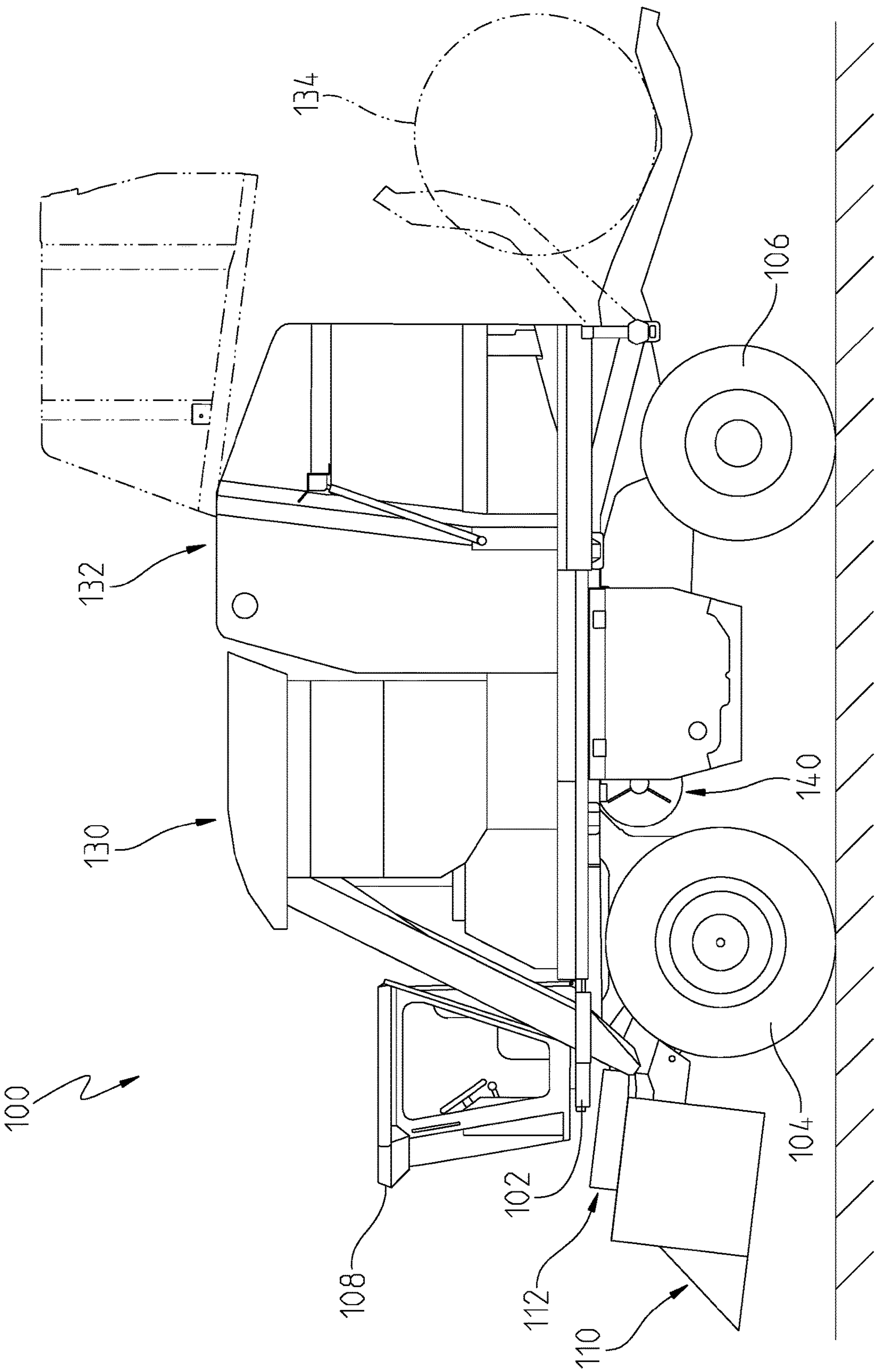
FIG. 1 is a side view of a cotton harvester.

Referring to FIG. 1, one embodiment of a cotton harvester 100 is shown having a main frame or chassis 102 supported for movement by ground engaging mechanisms such as forward drive wheels 104 and rear steerable wheels 106. An operator station or cab 108 is supported at the front end of the chassis 102 above forwardly mounted harvesting assembly such as cotton harvesting units 110 which remove cotton from plants and directs the removed cotton into an air duct system 112.

An accumulator system 130 is shown coupled to the chassis 102 behind the cab 108 for receiving the cotton from the air duct system 112. The accumulator system 130 stores cotton as necessary, and a metering floor uniformly distributes the cotton to a module builder or baler assembly 132 which first forms a compressed mat of material and then rolls the mat into a compact bale or module 134.

While the cotton harvester 100 may have several motors and drive systems for powering sub-assemblies, a prime mover 140 is the primary source of power to the sub-assemblies. More specifically, in one embodiment, the prime mover 140 may be a diesel or gas engine. The prime mover 140 may provide power to a ground drive, cotton fan, engine fan, and a cotton feeding system to name a few sub-assemblies. Further, the sub-assemblies may be powered through a hydraulic pump, electric generator, and/or mechanical drivetrain to name a few of the drive systems for the sub-assemblies driven by the prime mover 140.

While diesel and gas engines are described herein for the prime mover 140, other types of engines and drive systems are also considered. In one example, the prime mover may be a turbine engine. In another example, the prime mover may be an electric motor. In yet another example, the prime mover may by a hybrid combination of the diesel, gas, or turbine engine along with an electric generator and motor. Accordingly, many different types of prime movers 140 are considered herein.

Figure 2:
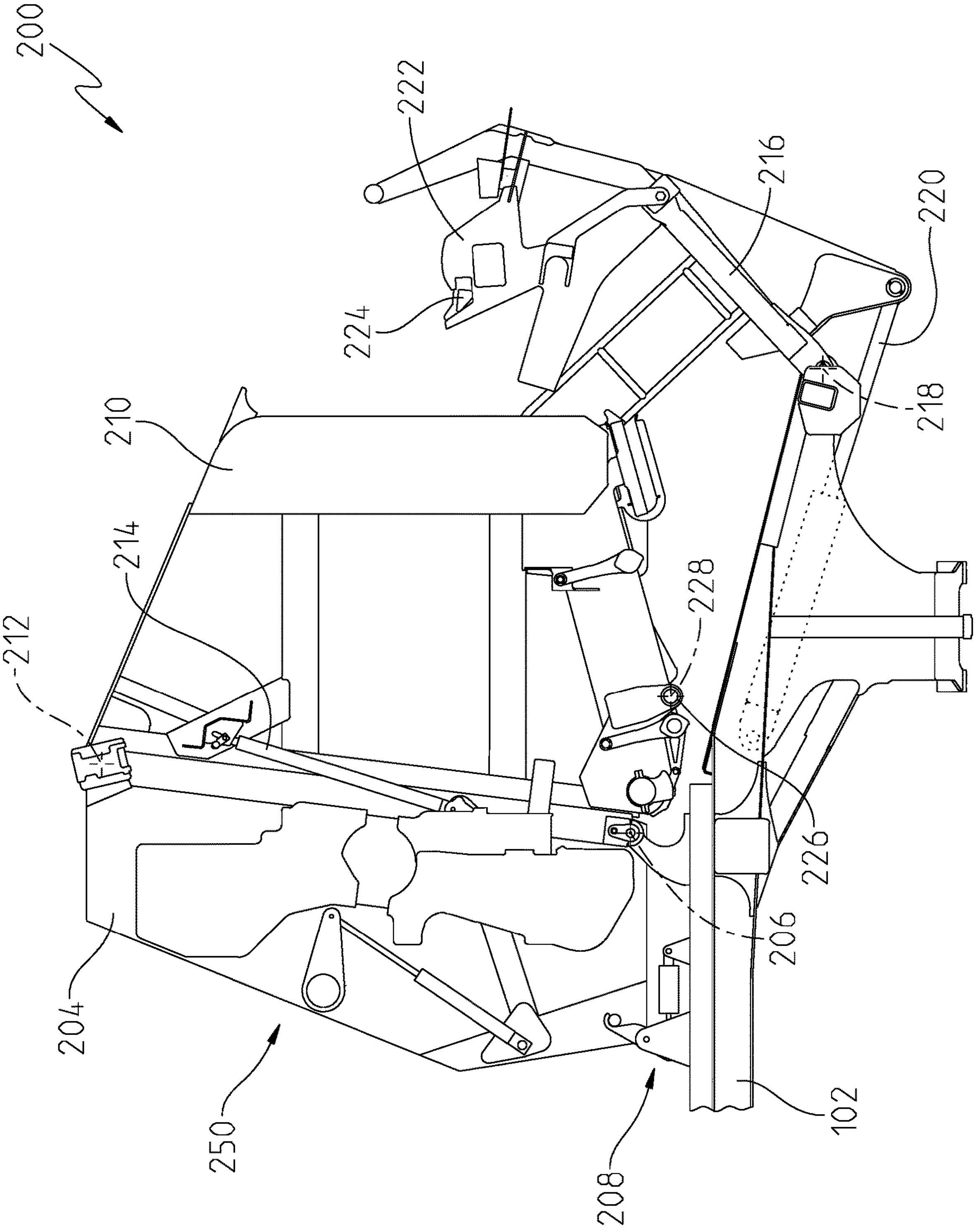
FIG. 2 is a side view of one embodiment of a bale assembly.

Referring now to FIG. 2, a module builder or baler assembly 200 of the present disclosure is illustrated. While not entirely illustrated in FIG. 2, the baler assembly 200 may also be a part of a cotton harvester similar to the cotton harvester 100. Accordingly, the baler assembly 200 is one embodiment of the baler assembly 132 illustrated on the cotton harvester 100 in FIG. 1. The baler assembly 200 may be coupled to the chassis 102 as discussed herein. More specifically, the baler assembly 200 may have a front component 204 pivotally coupled to the chassis about a front chassis axis 206. Further, a locking assembly 208 may be coupled to the chassis 102 to selectively engage a pin of the front component 204 to substantially prevent pivotal movement of the front component 204 about the front chassis axis 206 when coupled to the pin.

A gate component 210 may be pivotally coupled directly to the front component 204 at a component axis 212. Further, a gate cylinder 214 may be coupled to the front component 204 on one end and to the gate component 210 on the other. The gate cylinder 214 may be a linear actuator or the like that can be selectively linearly displaced (i.e., expanded and retracted) to pivot the gate component 210 away from the front component 204 about the component axis 212.

A plurality of continuous belts and rollers may be positioned in a forming space within the baler assembly 200 as is known in the art. The belts and rollers may define a space within the baler assembly 200 that allows harvested crop to manipulated into a bale or module via the belts and rollers. Once formed into a bale or module, the formed bale or module is deposited on the underlying surface by the baler assembly 200. In one aspect of this disclosure, the gate cylinder 214 may be engaged when a bale or module is formed in the baler assembly 200 and ready to be deposited. The gate cylinder 214 may become elongated to pivot the gate component 210 away from the front component 204 sufficiently far to allow the formed module to exit the forming space and become positioned at least partially on a handler 216.

The handler 216 may be pivotally coupled to the chassis 102 at a handler axis 218. Further, a handler cylinder 220 may extend from a portion of the handler 216 on one end to a portion of the chassis 102 on the other. In this configuration, the baler assembly 200 may selectively pivot the handler 216 about the handler axis 218 by changing the linear displacement of the handler cylinder 220. In one aspect of this disclosure, the handler 216 may capture a bale or module from the forming space in a raised orientation, and then pivot about the handler axis 218 to a lowered orientation to deposit the bale or module on the underlying surface.

While the baler assembly 200 is capable of functioning to create and deposit bales or modules as discussed herein, the baler assembly 200 can also be repositioned to become oriented in a transport and shipping configuration 340. More specifically, the pivotal relationship of the front component 204, gate component 210, and handler 216 about the axes 206, 212, and 218 is configurable to provide a reduced height of the baler assembly 200 that provides for safe and efficient transport and shipping of any cotton harvester having the baler assembly 200 discussed herein.

To facilitate the efficient transition from a work configuration 250 (see FIG. 2) to a transport configuration 330 (see FIG. 3*b*) or a shipping configuration 340 (see FIG. 3*c*), the baler assembly 200 may have a cradle 222 coupled to, or formed with, the handler 216. The cradle 222 may have a profiled slot 224 defined therein having an opening sized to receive a pin 226 of the gate component 210. As will be described in more detail herein, the pin 226 may be positioned within the opening of the profiled slot 224 of the cradle 222 to facilitate transitioning the baler assembly between the work configuration 250 and the transport configuration 330 or the shipping configuration 340.

Figure 3A:
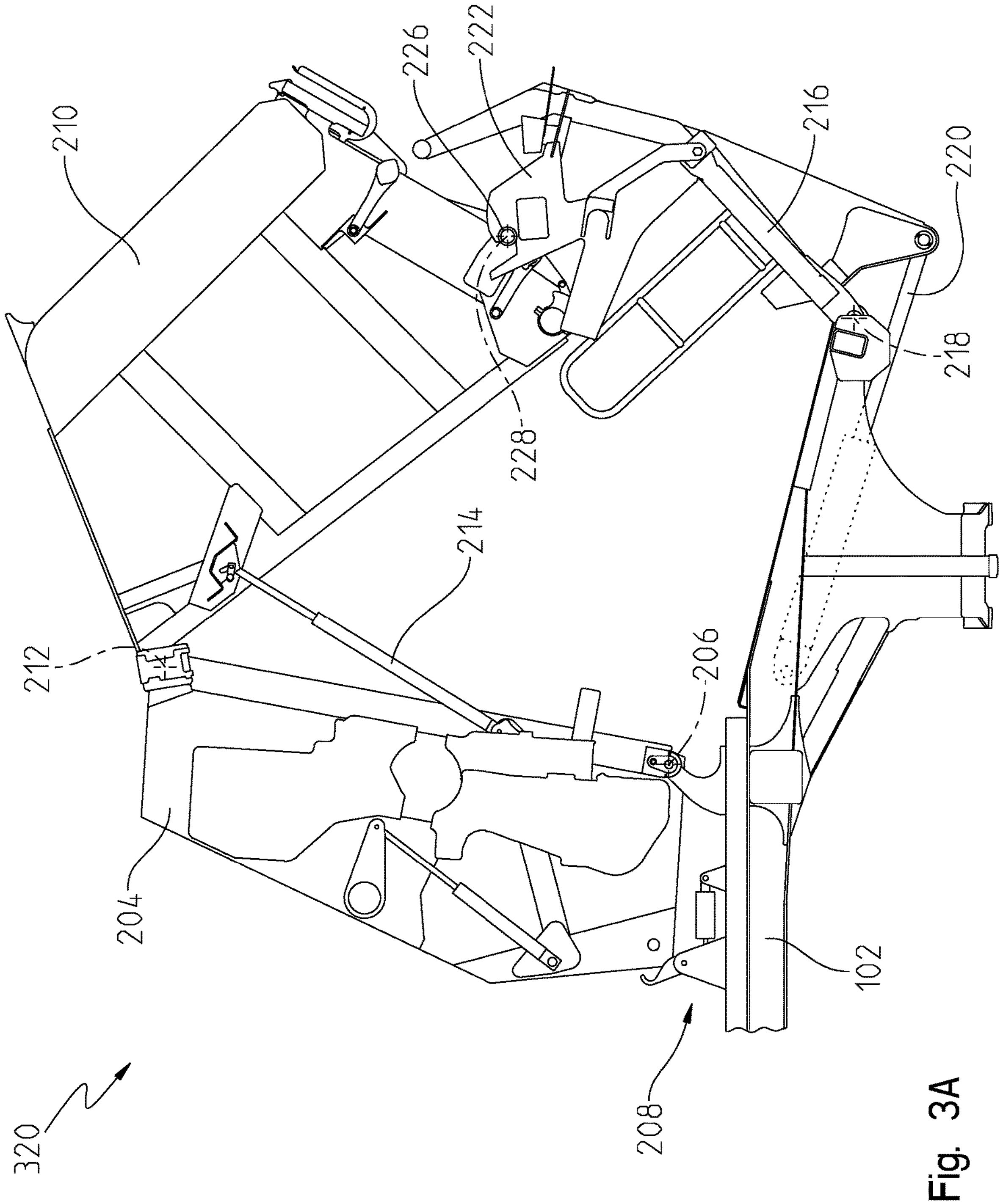
FIG. 3*a* is a side view of the bale assembly of FIG. 2 in a catch configuration.
Figure 3B:
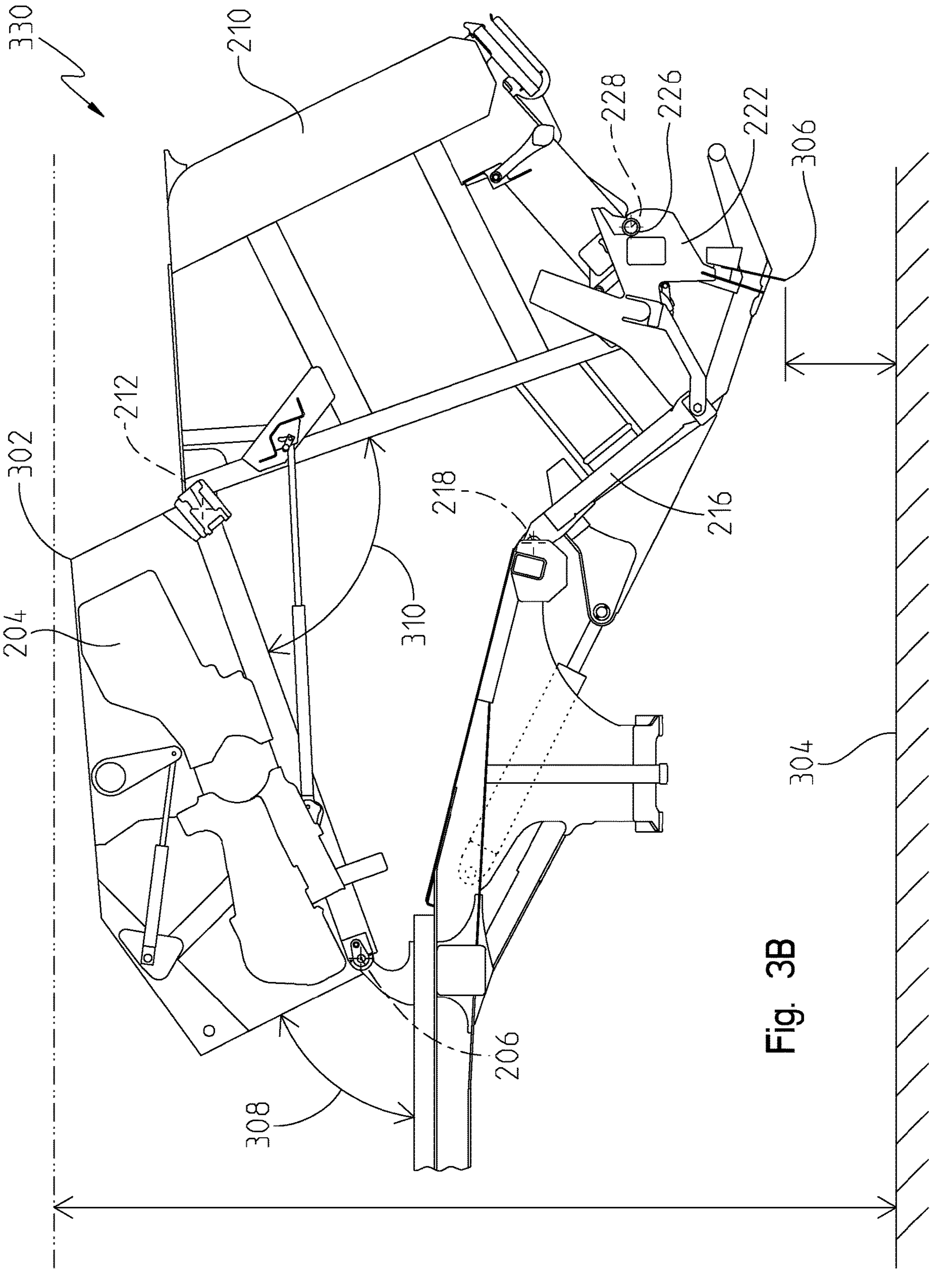
FIG. 3*b* is a side view of the bale assembly of FIG. 2 in a transport configuration.
Figure 3C:
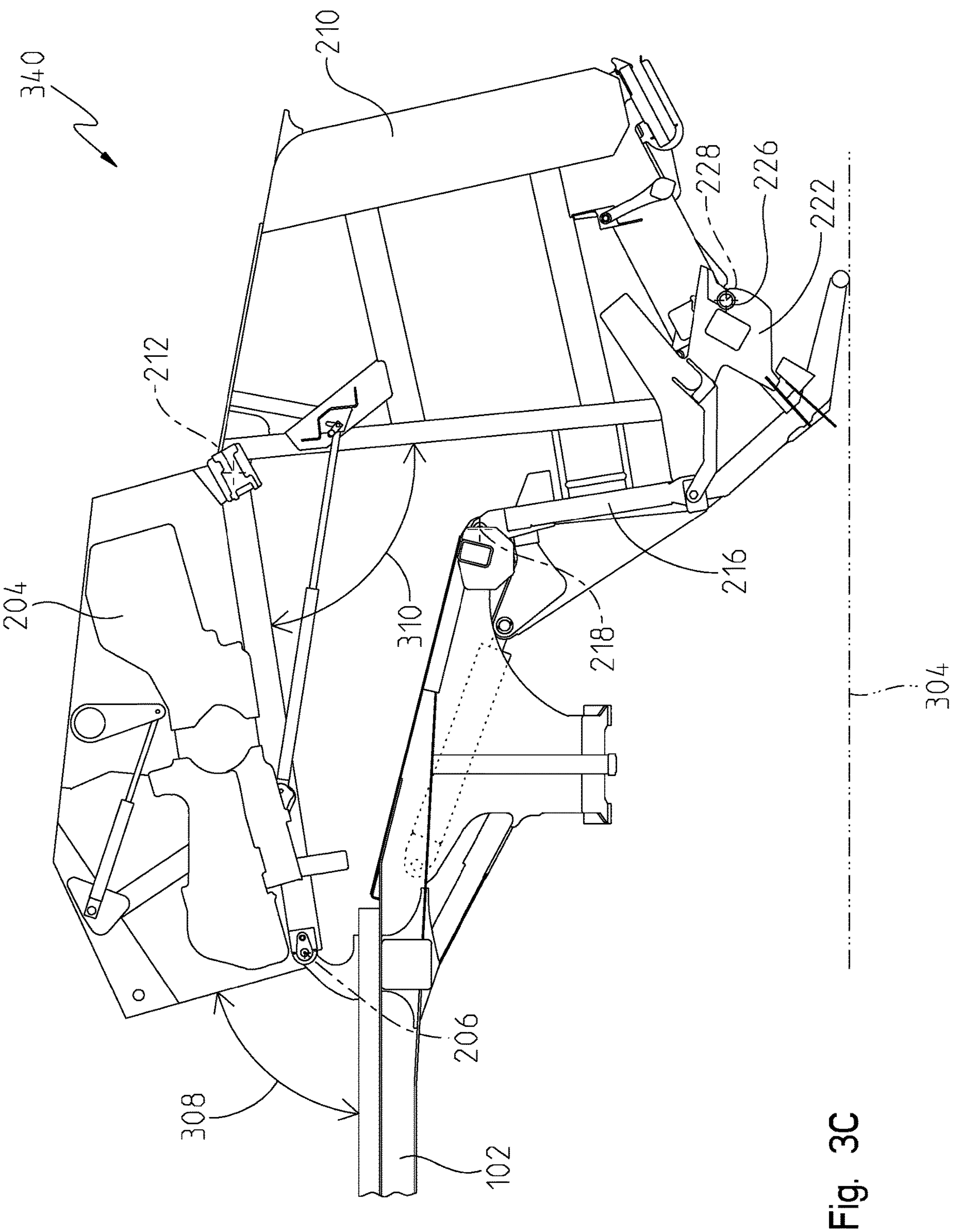
FIG. 3*c* is a side view of the bale assembly of FIG. 2 in a shipping configuration.
Figure 4A:
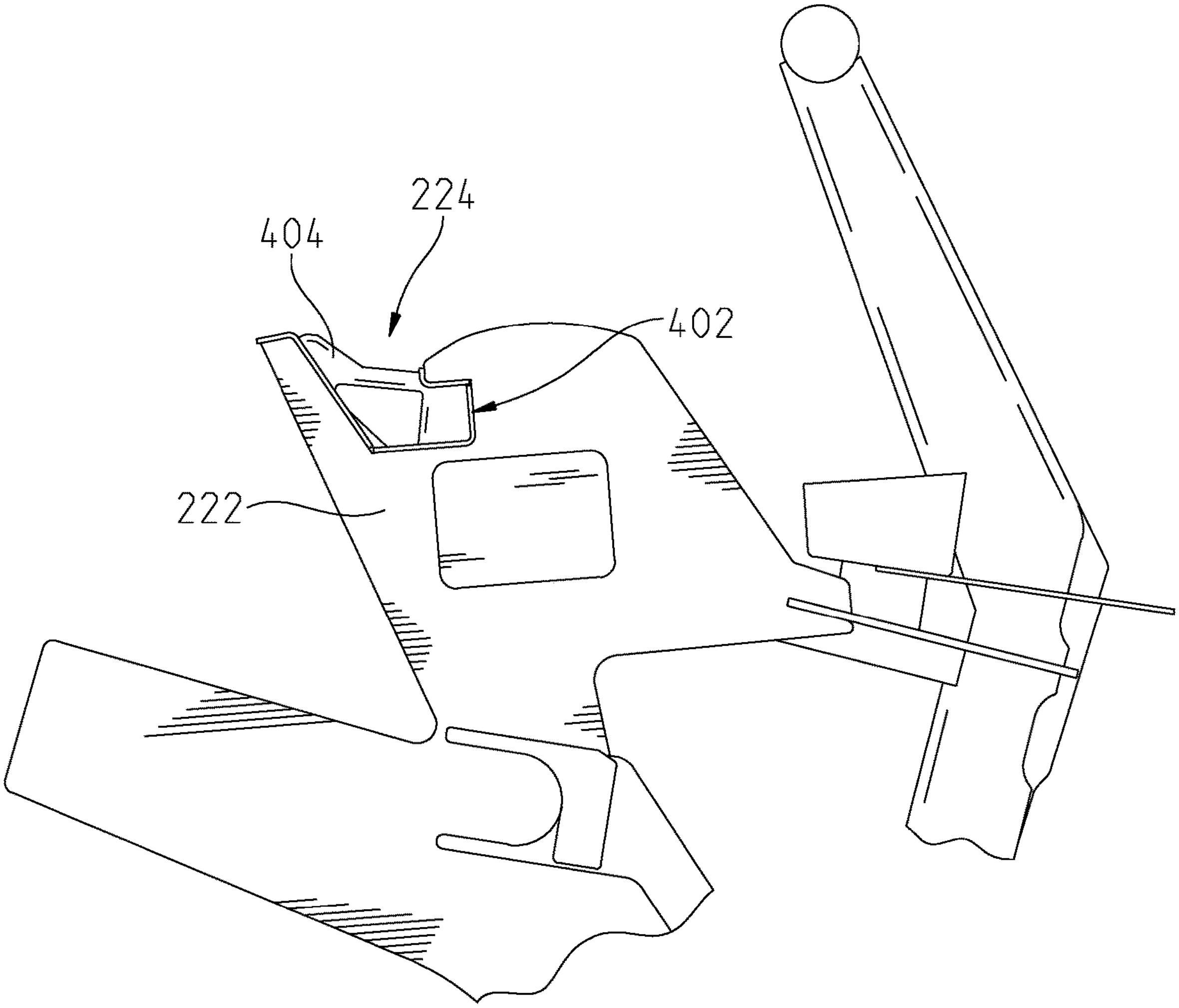
FIG. 4*a* is a detailed view of a cradle of the bale assembly of FIG. 2.
Figure 4B:
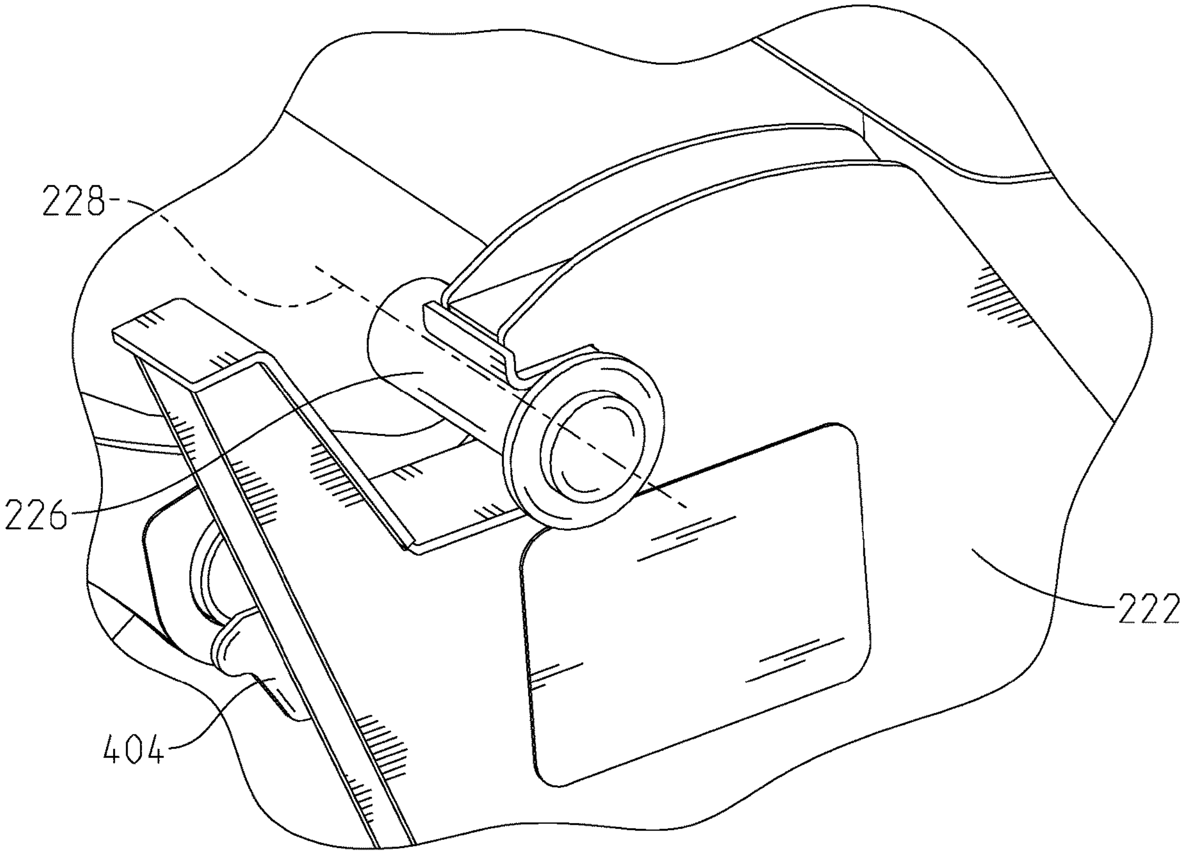
FIG. 4*b* is a detailed view of the cradle of FIG. 4*a* with a pin positioned in a profiled slot of the cradle.

Referring now to FIG. 3*a*, a catch configuration 320 of the baler assembly 200 is illustrated. In the catch configuration 320, the gate cylinder 214 may pivot the gate component 210 a predetermined amount away from the front component 204 so the pin 226 is positionable within the profiled slot 224 of the cradle 222 (see FIG. 4*b*). In one aspect of this disclosure, the gate cylinder 214 may pivot the gate component 210 about the component axis 212 and the handler cylinder 220 may pivot the handler 216 about the handler axis 218 to reposition the gate component 210 and the handler 216 so the pin 226 rests within the cradle 222. Further, before transitioning to the catch configuration 320, the locking assembly 208 may remain in a locked configuration wherein the front component 204 is substantially prevented from rotating about the front chassis axis 206. Once the gate pin 226 has moved at least partially into the profiled slot 224 of the cradle 222, the locking assembly 208 then disengages to allow the front component 204 to rotate about axis 206 to further allow the pin 226 to slide further into the profiled slot 224 of the cradle 222 and into the catch position illustrated in FIG. 4*b*.

Once the pin 226 is positioned in the cradle 222 in the catch configuration 320 (i.e., FIG. 4*b*), the gate cylinder 214 may be transitioned to a neutral state wherein the gate cylinder 214 can be relatively easily extended or retracted by external forces. For example, as the handler 216 is lowered to the transport configuration 330, the gate cylinder 214 may extend or retract to allow the gate component 210 to pivot about the component axis 212 relative to the front component 204. Further, the locking assembly 208 may be disengaged to allow the front component 204 to pivot about the front chassis axis 206. Once the gate cylinder 214 is in the neutral state and the locking assembly 208 is disengaged from the front component 204, movement of the handler 216 via the handler cylinder 220 about the handler axis 218 may cause both the gate component 210 and the front component 204 to be repositioned therewith.

In one aspect of this disclosure, after the baler assembly 200 is in the catch configuration 320 and the locking assembly 208 is disengaged and the gate cylinder 214 is in the neutral state, the pin 226 may define a pin axis 228 that is a pivotal point of the gate component 210 relative to the handler 216. More specifically, the pin 226 may become positioned within the profiled slot 224 and seated at a terminus 402 thereof. Once seated in the profiled slot 224, the pin 226 may pivot about the pin axis 228 as the handler 216 moves from the catch configuration 320 to the transport configuration 330 or the shipping configuration 340.

Once the pin 226 is seated in the profiled slot 224 of the cradle 222, the pin 226 may be substantially restricted from moving out of the seated position unless the baler assembly 200 is transitioned from the catch configuration 320 to the work configuration 250. More specifically, the pin 226 may become seated at the terminus 402 of the profiled slot 224 of the cradle 222 wherein the pin 226 is substantially restricted from further movement in all but one direction. Further, as the baler assembly 200 transitions from the catch configuration 320 to the transport configuration 330 or the shipping configuration 340, the profiled slot 224 of the cradle 222 becomes oriented such that the weight of the front component 204 and the gate component 210 act on the pin 226 to substantially maintain the pin 226 in the seated configuration at the terminus 402 in the profiled slot 224 of the cradle 222.

The cradle 222 may also have a gateway sensor assembly 404 across the opening of the profiled slot 224. The gateway sensor assembly 404 may identify when the pin 226 is positioned within the profiled slot 224 of the cradle 222 to ensure the baler assembly 200 does not release the locking assembly 208, among other things, if the pin 226 is not properly seated in the cradle 222. The gateway sensor assembly 404 may have a plate that is spring loaded to be positioned across the opening of the profiled slot when the pin 226 is not positioned therein. However, when the pin 226 enters the profiled slot 224, the pin 226 pushes the plate down and a sensor identifies that the plate has moved. When the gateway sensor assembly 404 identifies the pin 226 is in the profiled slot 224 through movement of the plate, the baler assembly 200 may unlock the locking assembly 208 to allow the pin 226 to slide to the terminus 402 of the profiled slot 224 of the cradle 222.

The handler cylinder 220 may substantially control the movement of the baler assembly 200 as it transitions from the catch configuration 320 to the transport configuration 330. More specifically, with the locking assembly 208 released and the gate cylinder 214 in the neutral state, the front component 204 may pivot about the front chassis axis 206 as the position of the handler 216 is altered by the handler cylinder 220. Similarly, as the handler 216 pivots about the handler axis 218, the gate component 210 may be pivotally altered about both the pin axis 228 through the pin

226 seated in the cradle 222 and the component axis 212 where the gate component 210 is pivotally coupled directly to the front component 204.

In other words, as the baler assembly 200 transitions from the catch configuration 320 to the transport configuration 330, the front chassis axis 206 and the handler axis 218 remain at a fixed location relative to the chassis 102. However, the component axis 212 and pin axis 228 may move relative to the chassis 102 to allow the front component 204 and gate component 210 to be repositioned.

The transport configuration 330 may be such that a topmost portion 302 of the baler assembly 200 is less than about four meters from the underlying surface 304. The transport configuration 330 may be such that the topmost portion 302 of the baler assembly 200 is lower than a maximum height for transporting a vehicle. While four meters is used herein as one example, this disclosure also contemplates implementing these teachings to achieve a maximum height in a transport configuration 330 that has a topmost portion 302 that is greater than four meters from the underlying surface 304. In other words, this disclosure considers implementing the teachings discussed herein to achieve a transport configuration 330 that has a topmost portion 302 that will not violate the local rules for transporting a vehicle at the jurisdiction where the cotton harvester 100 will be deployed for service.

In one aspect of this disclosure, a bottommost portion 306 of the handler 216 may be between about 400 millimeters and about 500 millimeters from the underlying surface 304. In this configuration, the topmost portion 302 is low enough so the cotton harvester 100 can move along the underlying surface 304 in the transport configuration 330 without being too tall to navigate expected obstacles during transport (i.e., overhead objects such as bridges, utility lines, and the like). Further, the bottommost portion 306 is high enough to ensure clearance of any obstacles on the underlying surface 304 or to otherwise accommodate grade changes in the underlying surface 304 as the cotton harvester 100 travels thereon.

In one aspect of this disclosure, the handler cylinder 220 may substantially lock the handler 216 in the transport configuration 330 once positioned therein. The handler cylinder 220 may lock the position of the handler 216 by closing hydraulic fluid therein for a hydraulic system, closing pneumatic fluid therein for a pneumatic cylinder, or selectively providing power to an electrical actuator to maintain the desired position, among other ways. Regardless of the particular system used, the handler cylinder 220 may be controlled to ensure the baler assembly 200 substantially remains in the transport configuration 330 until a different configuration is requested.

To achieve the transport configuration 330, the front component 204 may pivot relative to the chassis 102 by a first angle 308. The first angle 308 may be any angle that allows the front component 204 to be pivoted sufficiently downward to allow the topmost portion 302 to be less than four meters from the underlying surface 304 or to otherwise comply with local height restrictions for transport. In one aspect of this disclosure, the first angle 308 may be about sixty-three degrees in the transport configuration 330. However, this disclosure contemplates other angles for the first angle 308 that are capable of achieving the desired height of the topmost portion 302 in the transport configuration 330. More specifically, other embodiments considered herein have a first angle 308 that is less than sixty-three degrees in the transport configuration 330. Further still, in other embodiments considered herein the first angle 308 is more than sixty-three degrees in the transport configuration 330.

Similarly, a second angle 310 may be formed between the front component 204 and the gate component 210 as they pivot relative to one another about the component axis 212. In one embodiment of this disclosure, the second angle 310 may be about ninety degrees in the transport configuration 330. However, this disclosure contemplates utilizing any second angle 310 that is capable of achieving the desired height of the topmost portion 302 in the transport configuration 330. More specifically, other embodiments considered herein have a second angle 310 that is less than ninety degrees in the transport configuration 330. Further still, in other embodiments considered herein the first angle 308 is more than ninety degrees in the transport configuration 330.

The shipping configuration 340 may be intended to minimize the height of the baler assembly 200 when being moved by another vehicle or otherwise stored. In the shipping configuration 340, the handler 216 may move to a fully lowered orientation wherein a portion of the handler 216 contacts the underlying surface 304. In this configuration, the cotton harvester 100 is not intended to move along the underlying surface 304 because there is insufficient clearance of the handler 216. However, the shipping configuration 340 may be ideal for shipping the cotton harvester 100 on a separate vehicle such as a flatbed truck, train, or cargo ship.

Allowing the handler 216 to contact the ground in the shipping configuration 340 allows the baler assembly 200 to be reduced to a maximum height that is less than in the transport configuration 330. Further, in the shipping configuration 340 the handler cylinder 220 may not need to remain locked because the load of the handler 216, gate component 210, and front component 204 may be transferred to the underlying surface 304 through the handler 216. In the shipping configuration 340, the first angle 308 may be about seventy-four degrees and the second angle 310 may be about eighty-seven degrees. However, other angles for the first and second angle 308, 310 that allow the baler assembly 200 to be oriented as described are also contemplated herein as part of the shipping configuration 340. For example, the first angle 308 may be more or less than seventy-four degrees in the shipping configuration 340 in other embodiments contemplated herein. Similarly, the second angle 310 may be more or less than eighty-seven degrees in the shipping configuration 340 in other embodiments contemplated herein.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A baler assembly for a cotton harvester, comprising:
   a chassis;
   a front component pivotally coupled to the chassis about a front chassis axis;
   a gate component pivotally coupled directly to the front component about a component axis;
   a handler pivotally coupled to the chassis about a handler axis and configured to pivot between a raised orientation and a lowered orientation; and a cradle defined on the handler and configured to selectively receive a pin of the gate component;

wherein, the baler assembly transitions from a work configuration to a transport configuration by positioning the pin in the cradle and transitioning the handler to the lowered orientation while the gate component pivots about the component axis relative to the front component.

2. The baler assembly of claim 1, comprising a gate cylinder that selectively pivots the gate component about the component axis relative to the front component.

3. The baler assembly of claim 2, comprising a handler cylinder that selectively pivots the handler about the handler axis, wherein the handler cylinder and the gate cylinder are repositionable to position the pin of the gate component in the cradle.

4. The baler assembly of claim 1, wherein the cradle has a profiled opening that allows the pin to transition into, or out of, the cradle when the handler is in a catch configuration and prevents the pin from transitioning out of the cradle when the handler is in the lowered orientation.

5. The baler assembly of claim 1, wherein when the baler assembly transitions from the work configuration to the transport configuration, the front component pivots about the front chassis axis, the gate component pivots about the component axis and a pin axis defined by the pin, and the handler pivots about the handler axis.

6. The baler assembly of claim 1, wherein the gate component only pivots about the component axis relative to the front component as the baler assembly transitions between the work configuration and the transport configuration.

7. The baler assembly of claim 1, wherein the front component rotates about the front chassis axis greater than sixty degrees as the baler assembly transitions from the work configuration to the transport configuration.

8. The baler assembly of claim of claim 1, wherein the front component and the gate component rotate about the component axis greater than eighty degrees relative to one another as the baler assembly transitions from the work configuration to the transport configuration.

9. The baler assembly of claim 1, wherein the baler assembly is mounted to a work machine configured to move along a substantially planar underlying surface and the overall height of the baler assembly from the underlying surface to a top-most portion of the baler assembly in the transport configuration is no greater than four meters.

10. The baler assembly of claim 9, wherein a bottom-most portion of the handler is at least half a meter above the underlying surface in the transport configuration.

11. The baler assembly of claim 1, wherein the baler assembly transitions into a shipping configuration wherein the front component rotates about the front chassis axis greater than seventy degrees.

12. The baler assembly of claim 11, wherein an angle between the gate component and the front component is less in the shipping configuration than in the transport configuration.

13. A work machine for baling a crop, comprising:

a chassis having at least one ground engaging mechanism coupled thereto configured to selectively move the work machine along an underlying surface;

a harvesting assembly coupled to the chassis and configured to harvest a crop; and a baler assembly configured to arrange harvested crop into a bale or module, the baler assembly comprising:

a front component pivotally coupled to the chassis about a front chassis axis;

a locking assembly configured to selectively lock the front component to the chassis to prevent the front component from pivoting about the front chassis axis;

a gate component pivotally coupled to the front component about a component axis;

a handler pivotally coupled to the chassis about a handler axis and configured to pivot between a raised orientation and a lowered orientation;

a cradle defined on the handler and configured to selectively receive a pin of the gate component;

wherein, the baler assembly transitions from a work configuration to a transport configuration by releasing the locking assembly, positioning the pin in the cradle, and rotating the handler about the handler axis;

wherein, as the baler assembly transitions from the work configuration to the transport configuration the gate component pivots relative to the front component about the component axis;

wherein the component axis extends through a portion of the front component and a portion of the gate component as the baler assembly transitions between the work configuration and the transport configuration.

14. The work machine of claim 13, further comprising gateway sensor assembly configured to identify when the pin is positioned within the cradle, wherein the locking assembly is configured to selectively release after the pin is identified as properly seated in the cradle by the gateway sensor.

15. The work machine of claim 13, comprising a gate cylinder that selectively pivots the gate component about the component axis relative to the front component and a handler cylinder that selectively pivots the handler about the handler axis, wherein the handler cylinder and the gate cylinder are repositionable to position the pin of the gate component in the cradle.

16. The work machine of claim 15, wherein once the pin is positioned in the cradle, the handler cylinder transitions the gate component and front component into the transport configuration and the gate cylinder is in a neutral state.

17. The work machine of claim 13, wherein when the baler assembly transitions from the work configuration to the transport configuration, a pin axis and component axis move relative to the chassis and the gate component is confined to movement about the pin axis and the component axis.

18. The work machine of claim 13, wherein the overall height of the baler assembly from the underlying surface to a top-most portion of the baler assembly in the transport configuration is no greater than four meters.

19. The work machine of claim 13, wherein the baler assembly transitions into a shipping configuration wherein an angle between the gate component and the front component is less in the shipping configuration than in the transport configuration.

20. A cotton-harvesting machine, comprising:

a chassis having at least one ground engaging mechanism configured to selectively move the chassis along an underlying surface;

a baler assembly having a front component pivotally coupled to a gate component about a single component axis;

a handler pivotally coupled to the chassis about a handler axis; and a cradle defined on the handler and configured to selectively catch a pin of the gate component and guide the pin into a constrained pivot position;

wherein, the baler assembly transitions from a work configuration to a transport configuration by positioning the pin in the cradle and moving the handler to a lowered position;

wherein, as the baler assembly transitions to the lowered position, the front component pivots relative to the chassis and the gate component pivots relative to the front component about the component axis.

* * * * *